Figure 14:
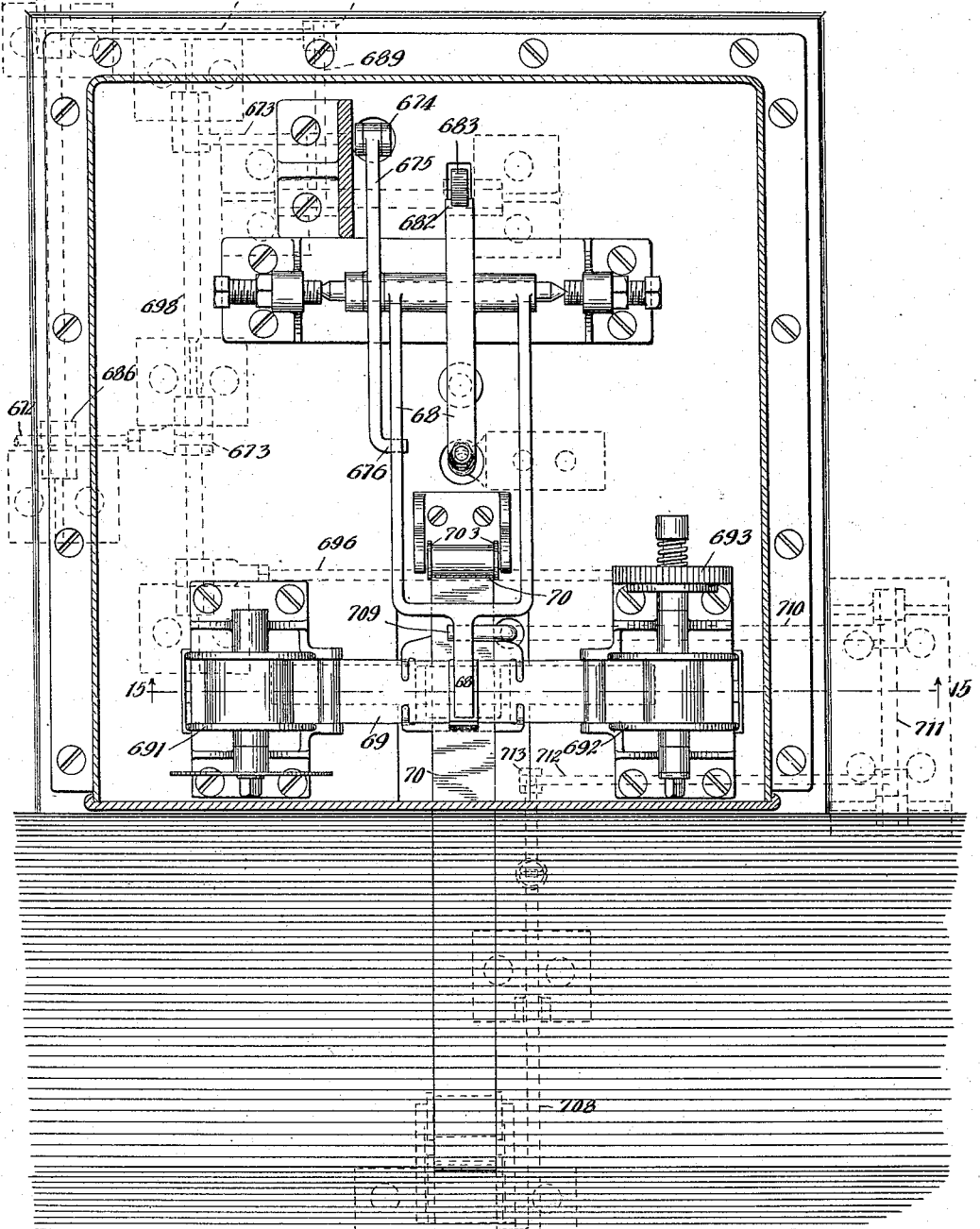

G. GOETZ.
RAILWAY RECORDING SCALE.
APPLICATION FILED MAY 6, 1911.
1,147,797.
Patented July 27, 1915.
15 SHEETS—SHEET 1.
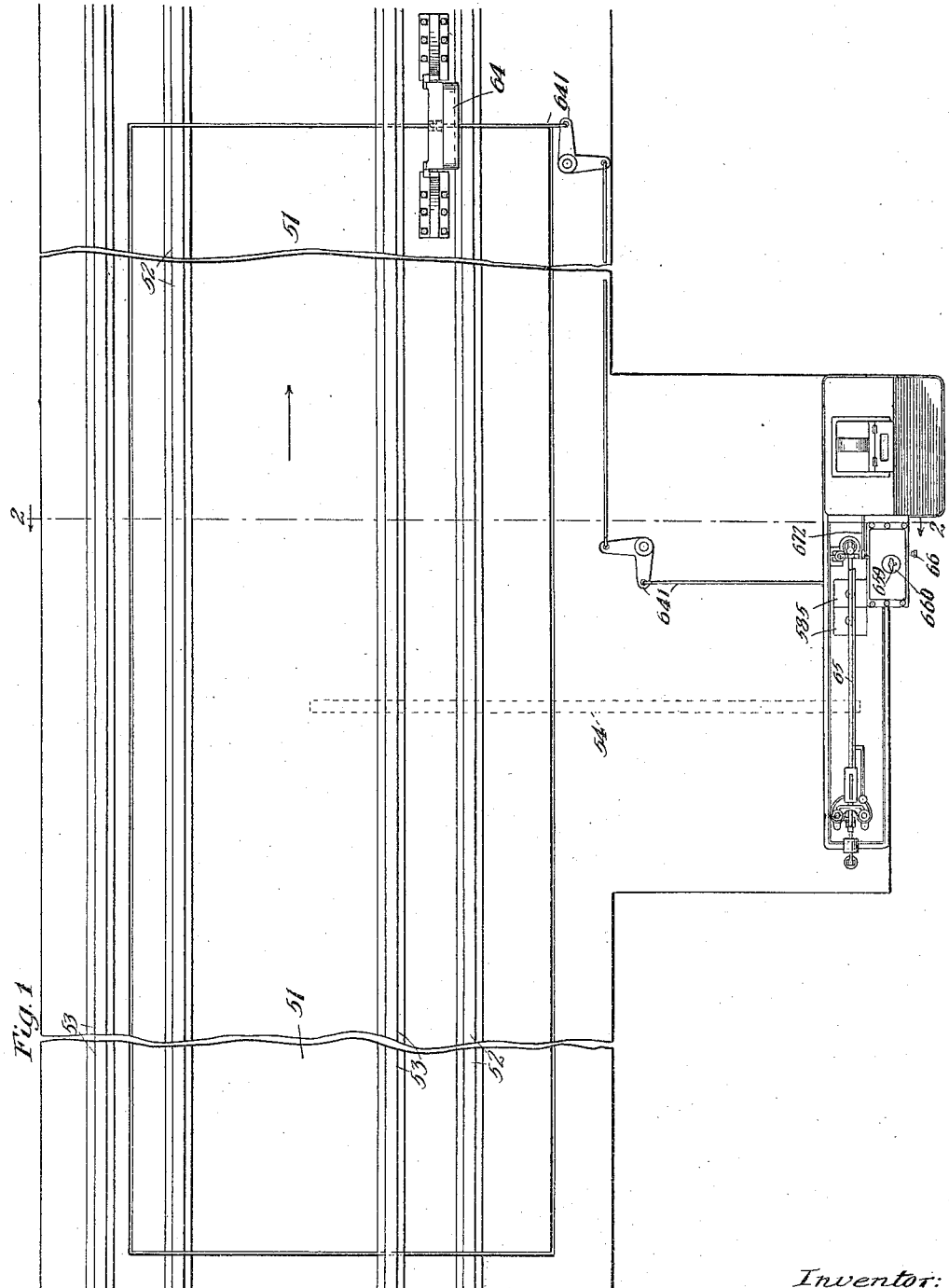
Witnesses:
Wm. Geiger
Inventor:
George Goetz
By Munday, Evarts, Adcock & Clarke,
Attys G. GOETZ.
RAILWAY RECORDING SCALE.
APPLICATION FILED MAY 6, 1911.
1,147,797.
Patented July 27, 1915.
15 SHEETS—SHEET 2.
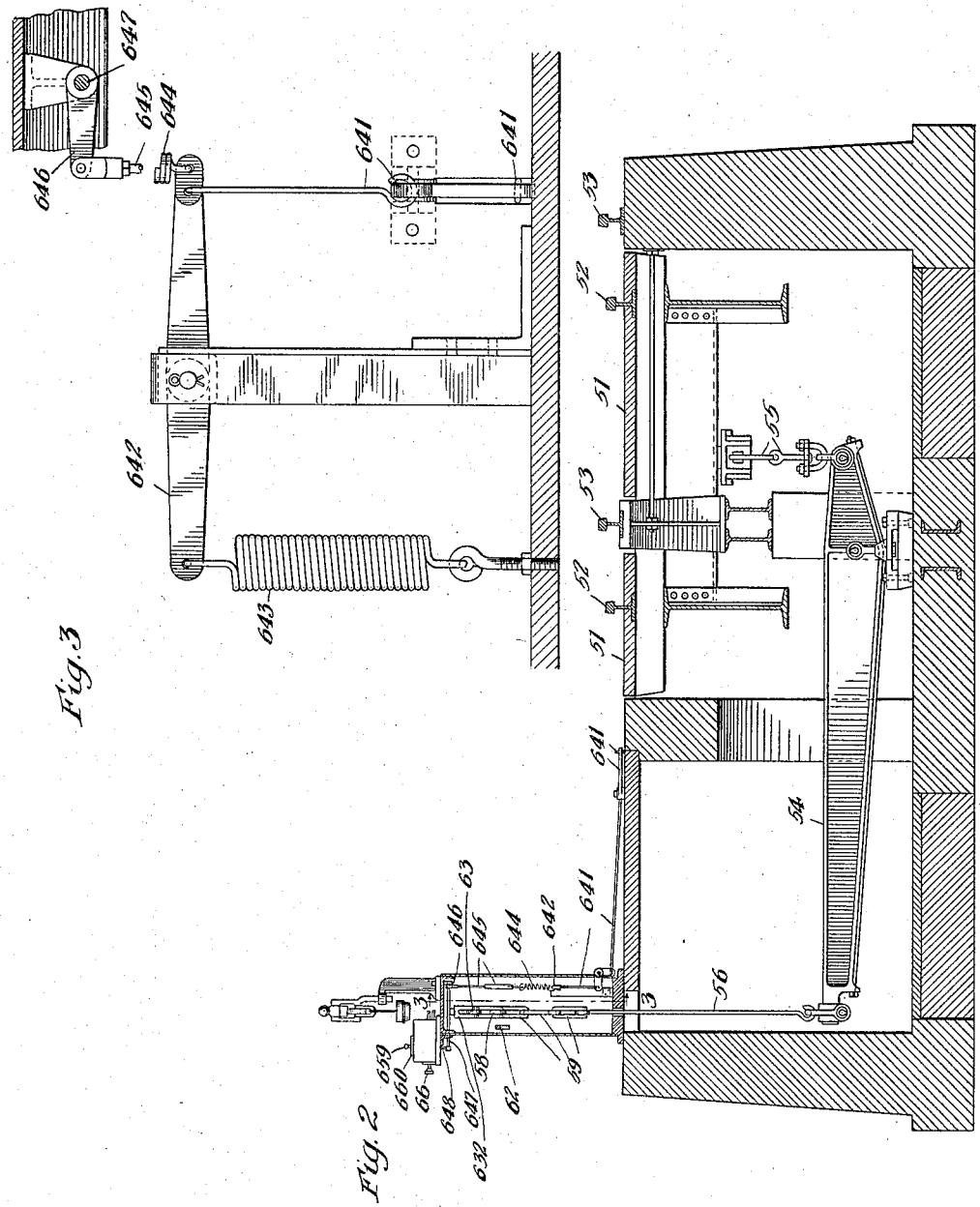
Witnesses:
Wm. Geiger
Inventor:
George Goetz
By Munday, Evarts, Adcock & Clarke,
Attys.

G. GOETZ.
RAILWAY RECORDING SCALE.
APPLICATION FILED MAY 6, 1911.
1,147,797.
Patented July 27, 1915.
15 SHEETS—SHEET 3.
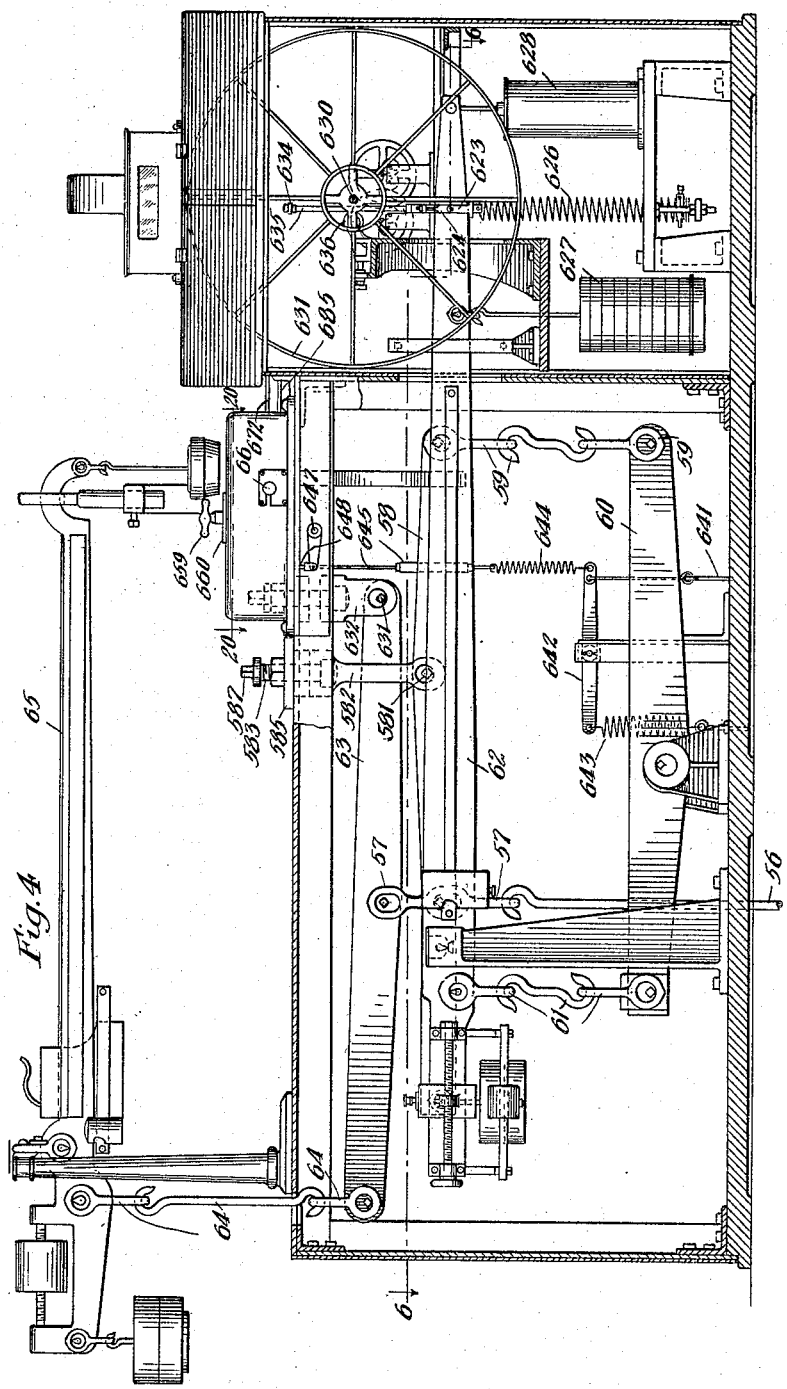
Witnesses:
Wm. Geiger
H. W. Munday
Inventor:
George Goetz
By Munday, Evarts, Adcock & Clarke
Attys G. GOETZ.
RAILWAY RECORDING SCALE.
APPLICATION FILED MAY 6, 1911.
1,147,797.
Patented July 27, 1915.
15 SHEETS—SHEET 4.
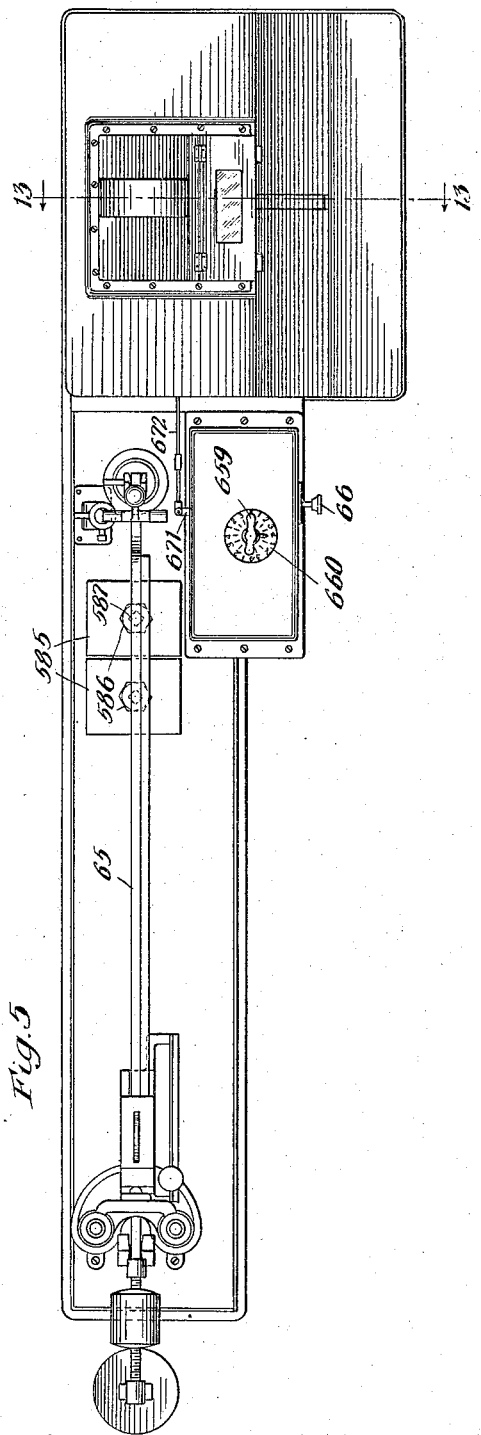
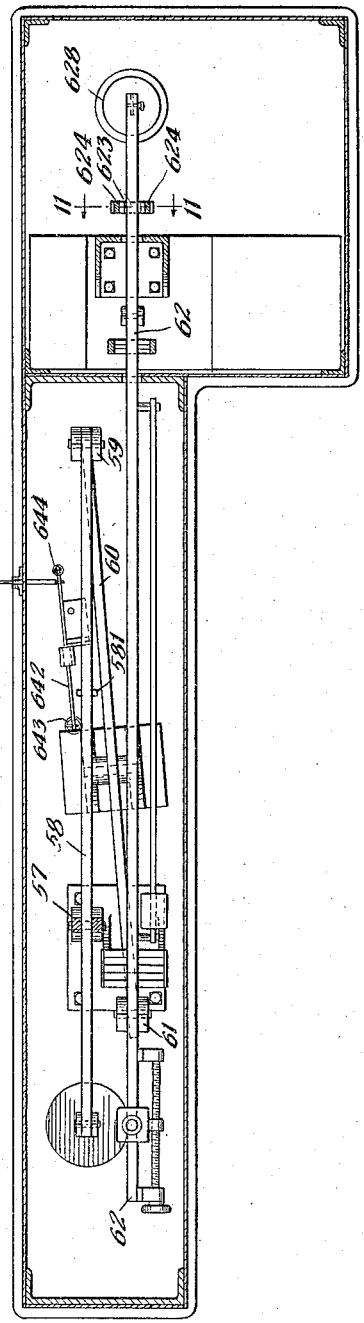
Witnesses:
Wm. Geiger
H. M. Munday
Inventor:
George Goetz
By Munday, Evarts, Adcock & Clarke,
Attys

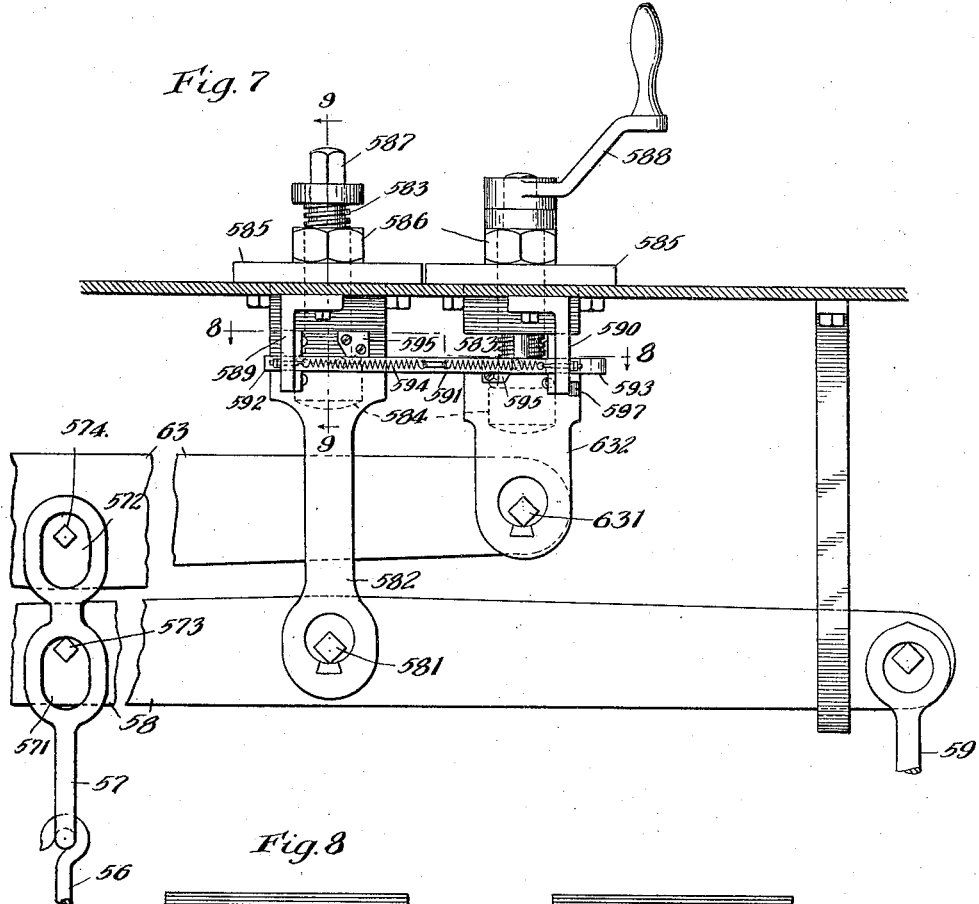
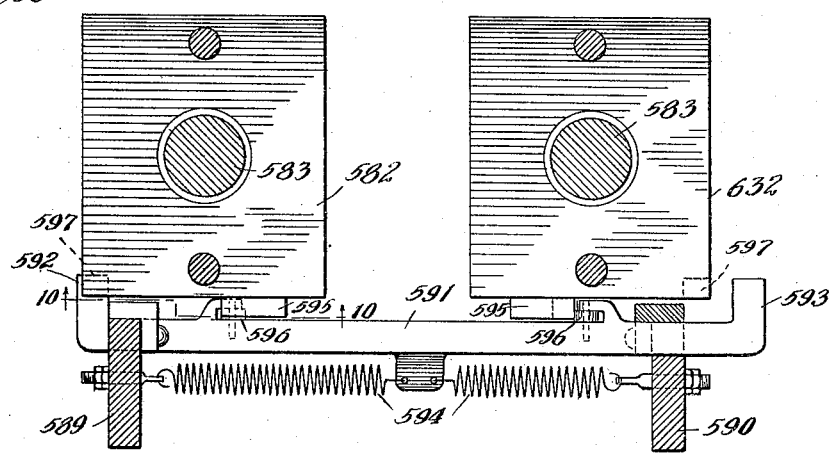

G. GOETZ.
RAILWAY RECORDING SCALE.
APPLICATION FILED MAY 6, 1911.
1,147,797.
Patented July 27, 1915.
15 SHEETS—SHEET 6.
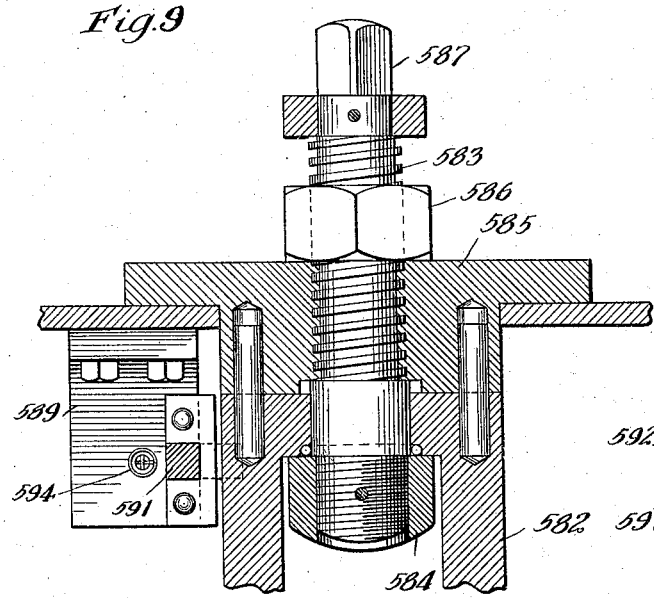
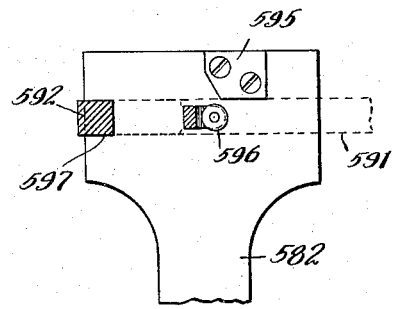
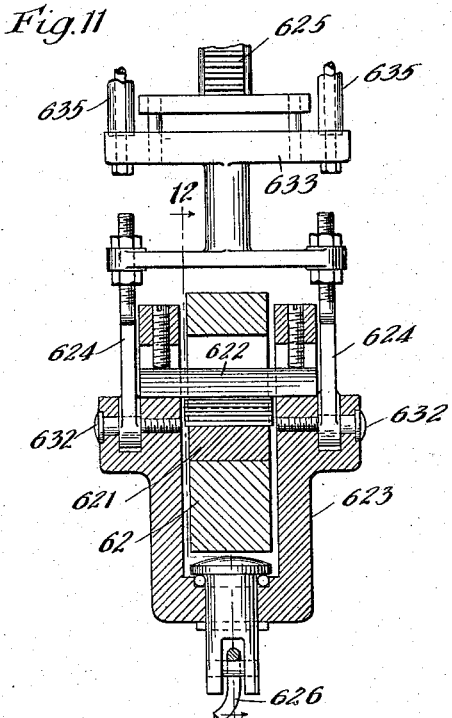
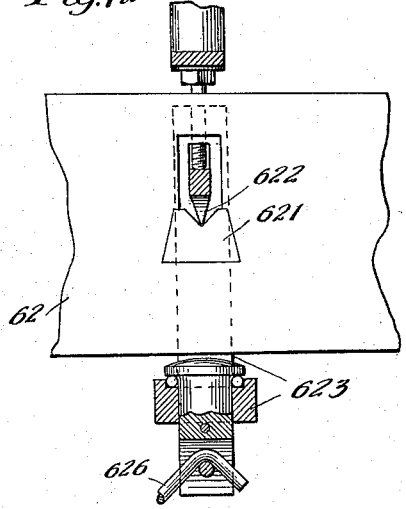
Witnesses:
Inventor:
George Goetz

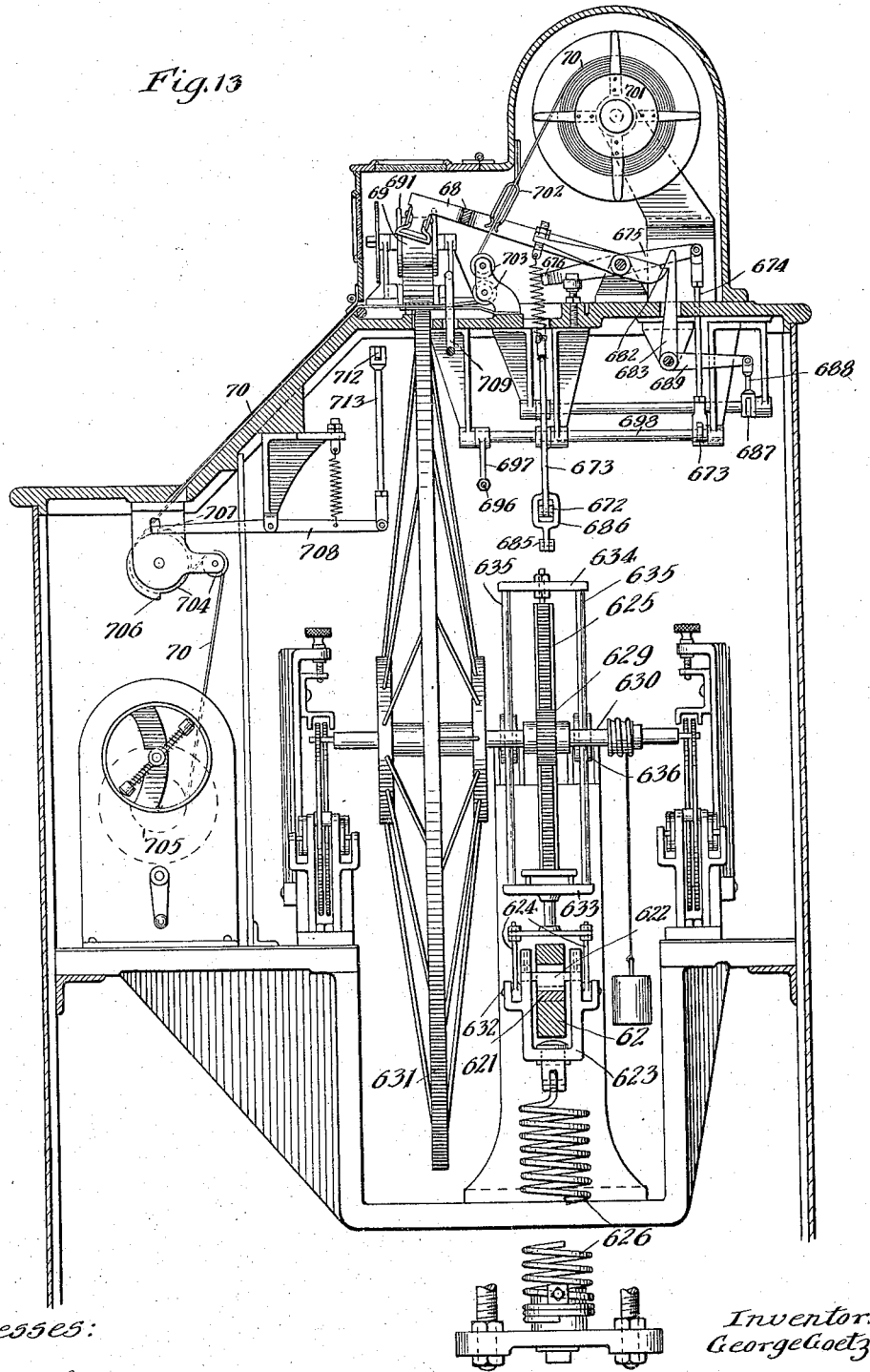

G. GOETZ.
RAILWAY RECORDING SCALE.
APPLICATION FILED MAY 6, 1911.

1,147,797.

Patented July 27, 1915.
15 SHEETS—SHEET 8.

Witnesses:

Inventor
George Goetz
By Munday, Evarts, Adcock & Clarke
Attys.

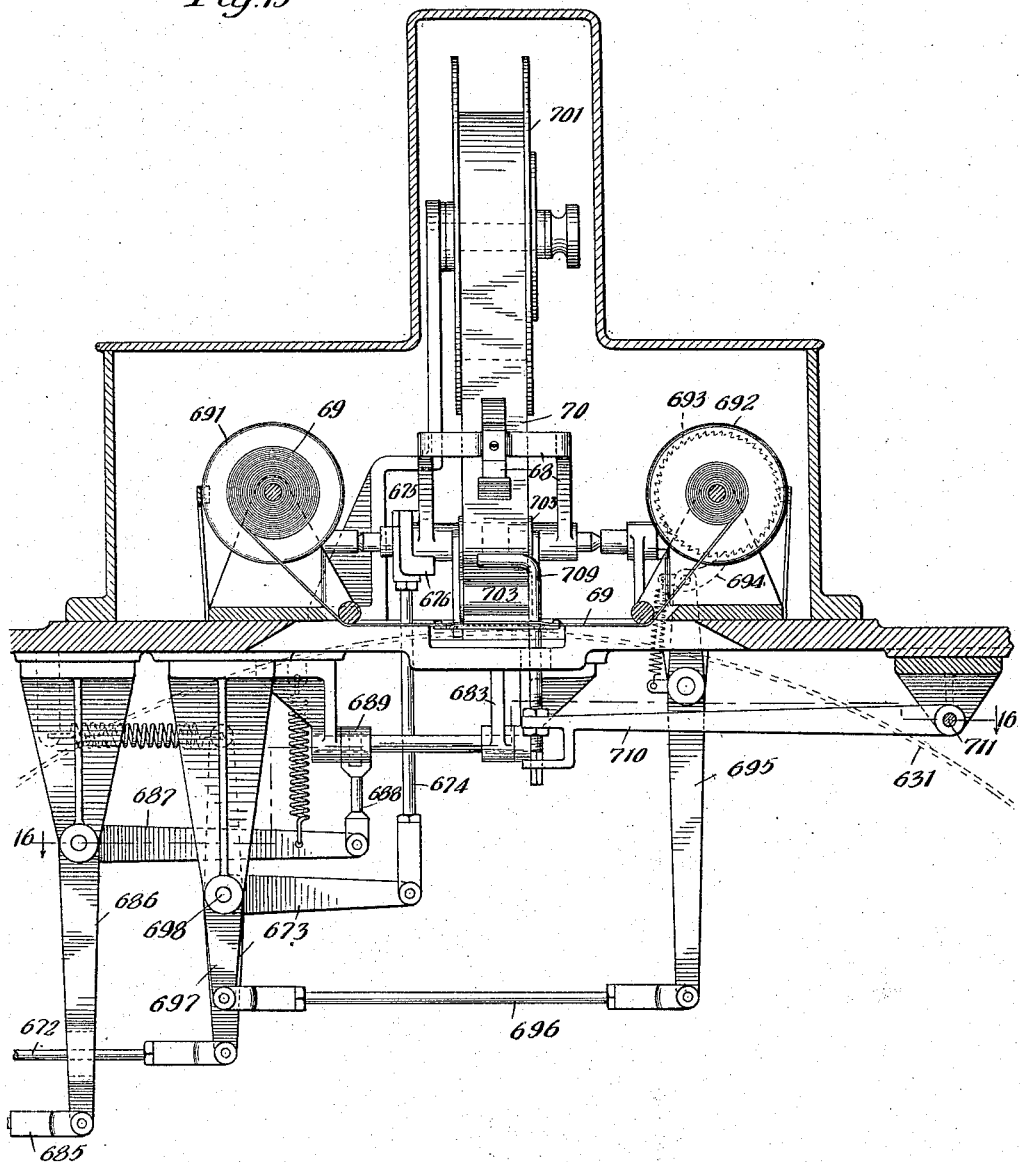

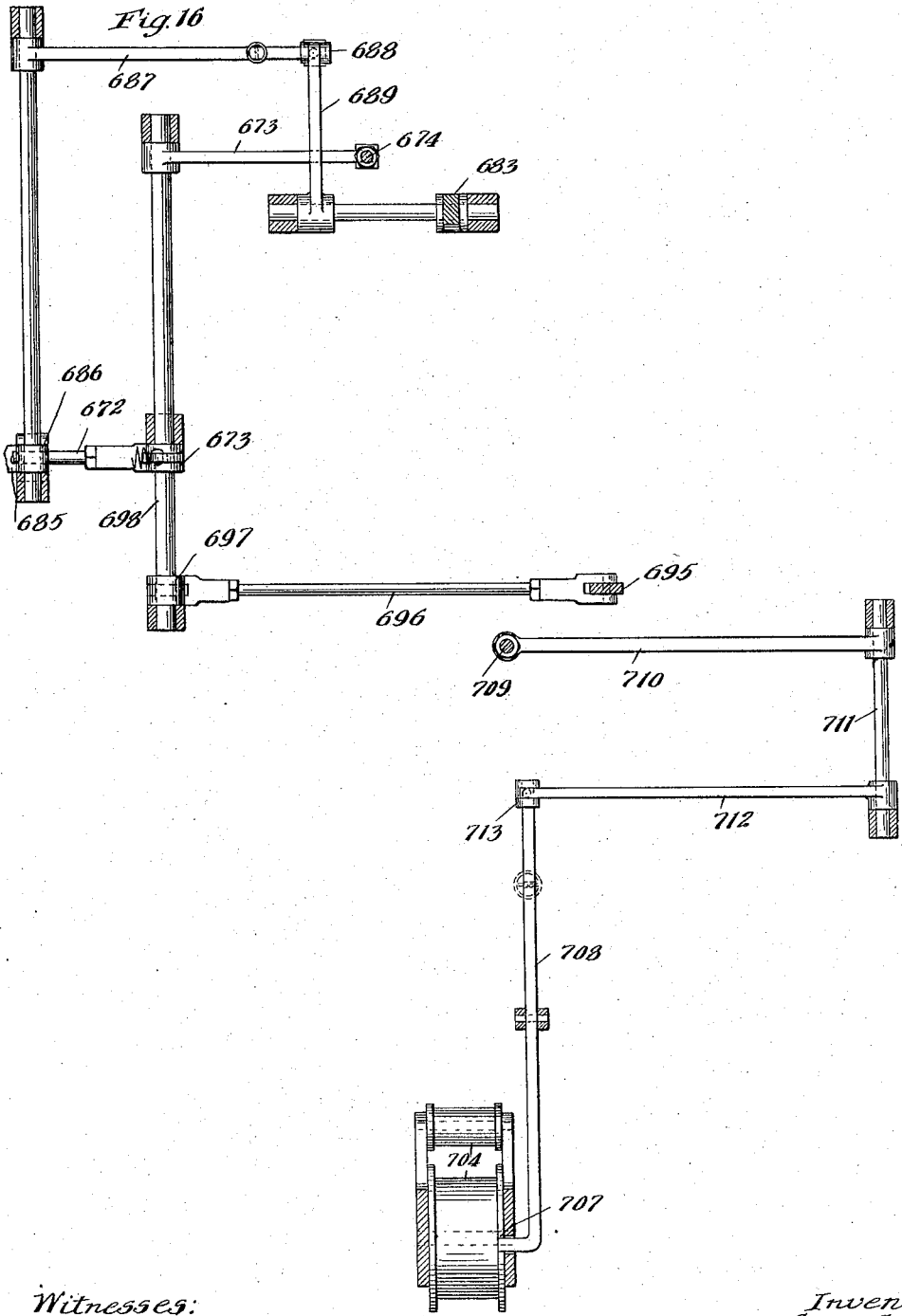

G. GOETZ.
RAILWAY RECORDING SCALE.
APPLICATION FILED MAY 6, 1911.
1,147,797.
Patented July 27, 1915.
15 SHEETS—SHEET 11.
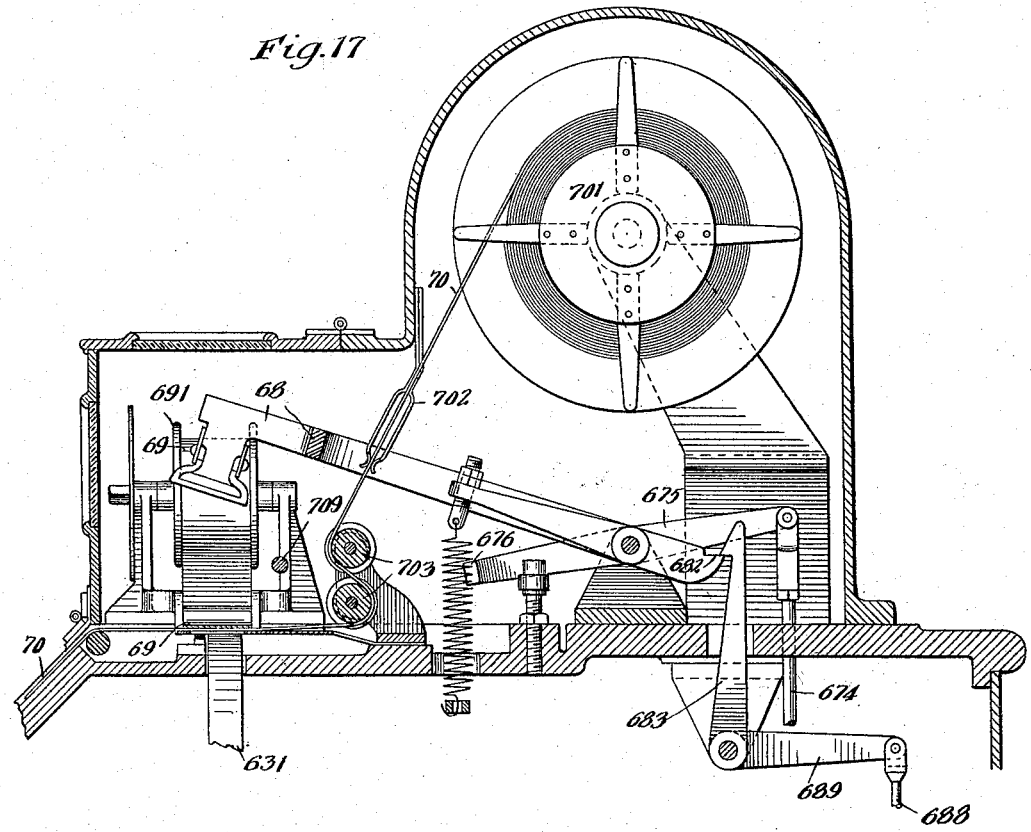
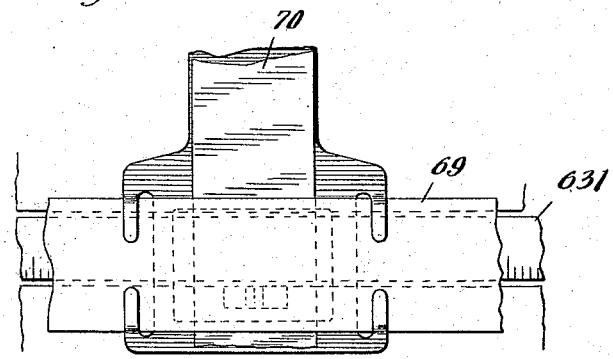
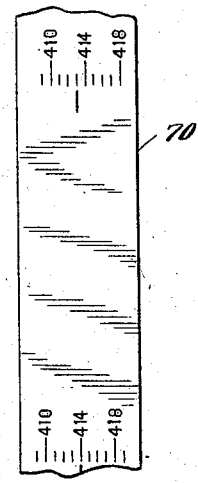
Witnesses:
Wm. Geiger
H. W. Munday
Inventor:
George Goetz
By Munday, Evarts, Adcock & Clarke,
Attys.

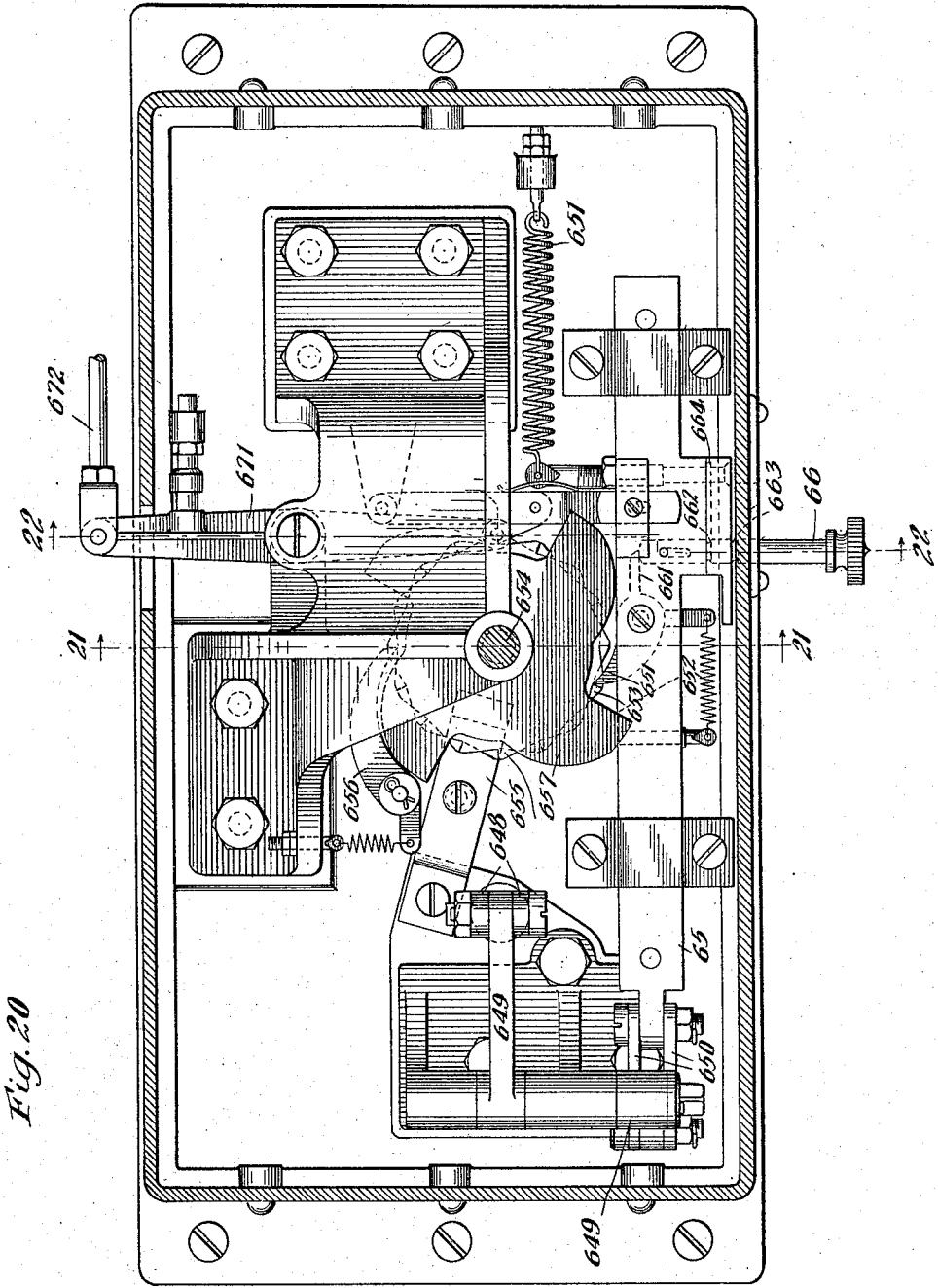

G. GOETZ.
RAILWAY RECORDING SCALE.
APPLICATION FILED MAY 6, 1911.

1,147,797.

Patented July 27, 1915.
15 SHEETS—SHEET 13.

Witnesses:
Wm Geiger

Inventor:
George Goetz
By Munday, Evarts, Adcock & Clarke
Attys.

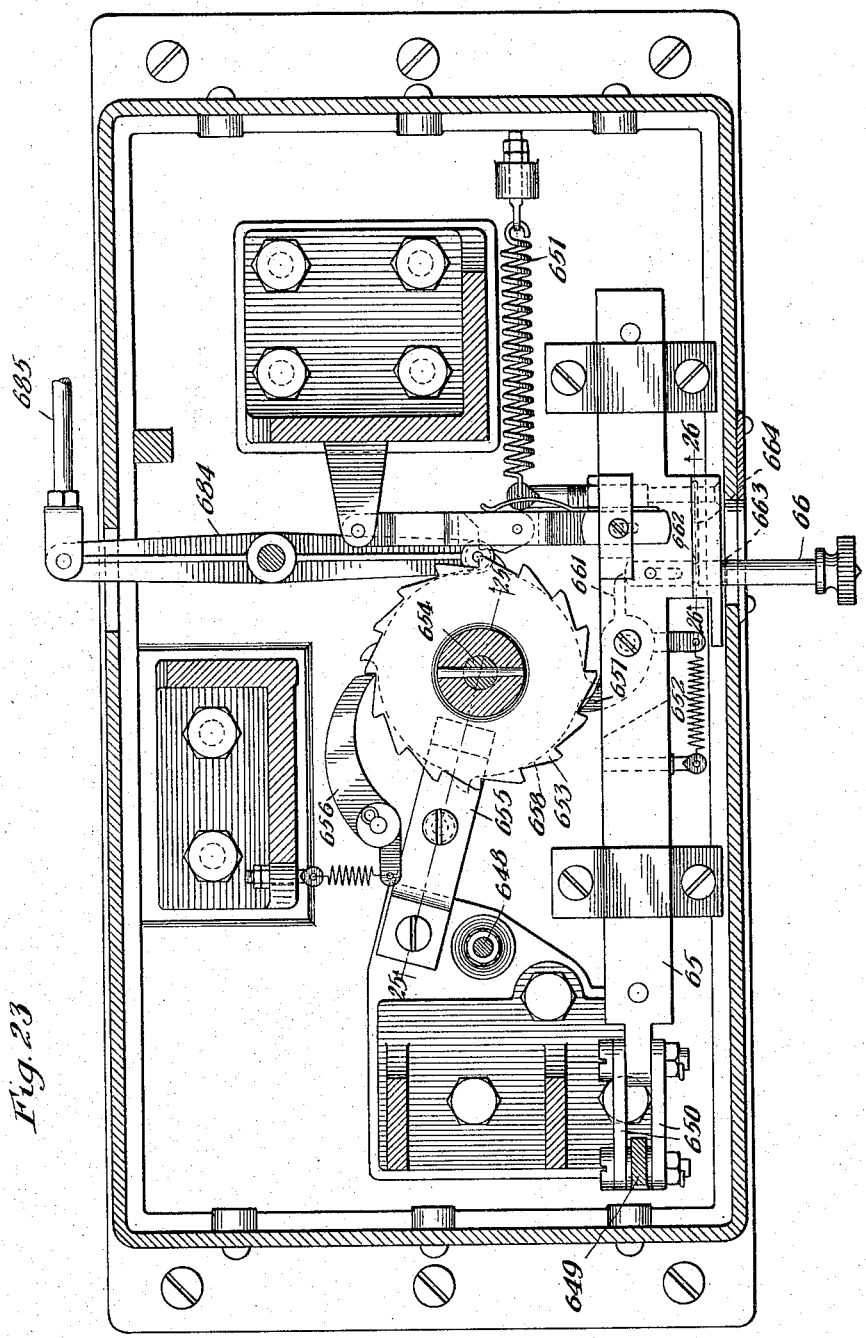

G. GOETZ.
RAILWAY RECORDING SCALE.
APPLICATION FILED MAY 6, 1911.
1,147,797.
Patented July 27, 1915.
15 SHEETS—SHEET 15.
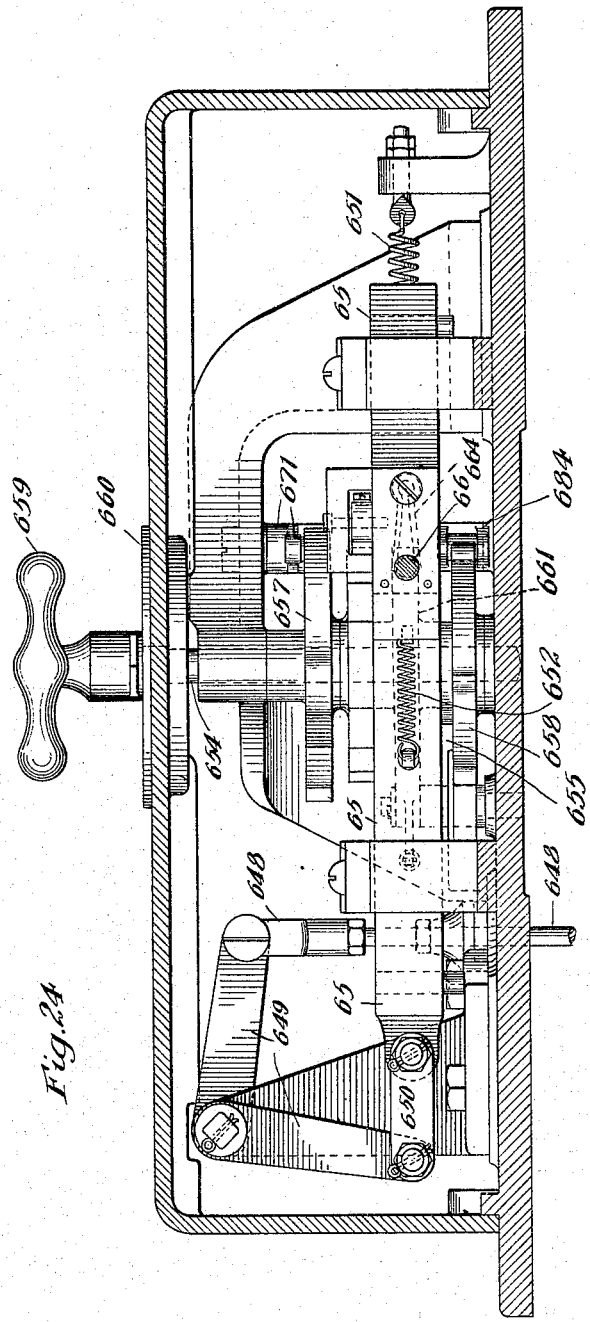
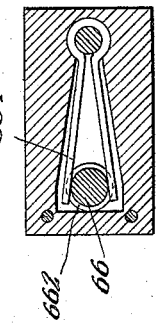
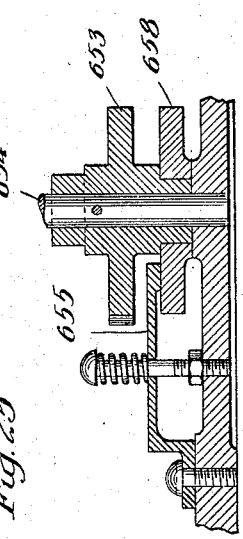
Witnesses:
Inventor:
George Goetz
By Munday, Evarts, Adcock & Clark,
Attys.

UNITED STATES PATENT OFFICE.

GEORGE GOETZ, OF CHICAGO, ILLINOIS, ASSIGNOR TO STREETER-AMET WEIGHING & RECORDING COMPANY, OF CHICAGO, ILLINOIS, A CORPORATION OF ILLINOIS.

RAILWAY RECORDING-SCALE.

1,147,797. Specification of Letters Patent. Patented July 27, 1915.

Application filed May 6, 1911. Serial No. 625,499.

*To all whom it may concern:*

Be it known that I, GEORGE GOETZ, a citizen of the United States, residing in Chicago, in the county of Cook and State of Illinois, have invented a new and useful Improvement in Railway Recording-Scales, of which the following is a specification.

This invention relates to improvements in railway recording scales.

The general purpose of the invention is to provide a scale in which the weight of the passing car may not only be indicated and recorded but also, if desired transferred or transmitted to and indicated upon a secondary scale beam operated by hand as ordinary scales are operated. And the invention consists in the double-beam-scale, operating either automatically to both record the weight and to count the passage of the cars, or operating when so desired to count the passage of the cars automatically and to transfer the weight indication to a hand operated beam; and it further consists in the novel parts or devices and combinations thereof shown in the accompanying drawings and hereinafter described and claimed.

Figure 21:
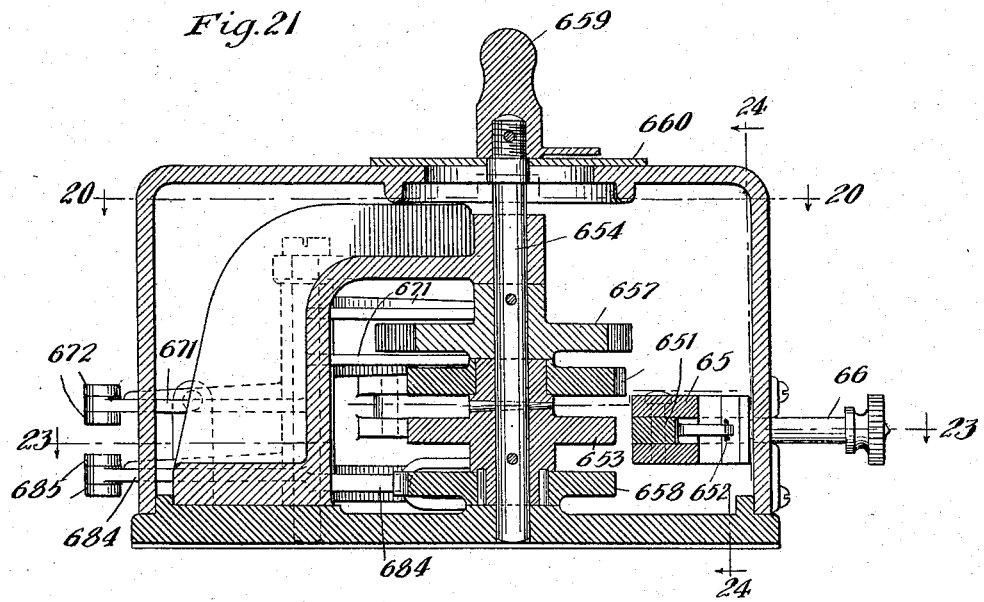
Figure 22:
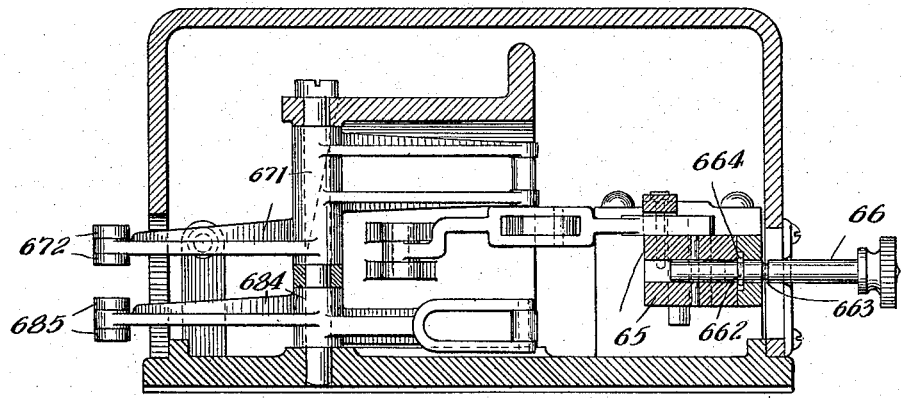

In the accompanying drawings which form a part of this specification, Figure 1 is a plan view of the trap, platform and scale; Fig. 2 a vertical cross section on the line 2—2 of Fig. 1; Fig. 3 a section on line 3—3 of Fig. 2 upon a somewhat larger scale; Fig. 4 an elevation partly in section of that portion of the scale which is above the platform; Fig. 5 a plan view of the scale above the platform; Fig. 6 a horizontal section of the same on the line 6—6 of Fig. 4; Fig. 7 a vertical sectional view upon a larger scale of the transfer mechanism for shifting the action of the platform from the automatic recording beam to the hand beam; Fig. 8 a horizontal section on the line 8—8 of Fig. 7; Fig. 9 a vertical section on the line 9—9 of Fig. 7; Fig. 10 a vertical section on the line 10—10 of Fig. 8; Fig. 11 a vertical section on the line 11—11 of Fig. 6; Fig. 12 a vertical section on the line 12—12 of Fig. 11; Fig. 13 a vertical section on the line 13—13 of Fig. 5; Fig. 14 a plan view, partly in section, of the printing mechanism for recording the weight; Fig. 15 a vertical section on the line 15—15 of Fig. 14; Fig. 16 a horizontal section on the line 16—16 of Fig. 15; Fig. 17 a partial vertical section the same as the larger part of Fig. 13, being enlarged for clearness; Fig. 18 a partial plan upon a larger scale of the ribbon holder, also shown in Fig. 14; Fig. 19 a view of a fragment of the paper tape showing the manner of printing the weights in recording the same; Fig. 20 a horizontal section upon a larger scale of the counter mechanism taken on the line 20—20 of Fig. 4,—the line of this section is also indicated in Fig. 21; Fig. 21 is a vertical section on the line 21—21 of Fig. 20; Fig. 22 a section on the line 22—22 of Fig. 20; Fig. 23 a section on the line 23—23 of Fig. 21; Fig. 24 a section on the line 24—24 of Fig. 21; Fig. 25 a section on the line 25—25 of Fig. 23; Fig. 26 a section on the line 26—26 of Fig. 23.

Like characters of reference made use of in the several figures indicate like parts wherever employed.

In said drawings 51 is the platform of the scale bearing the weighing track or live rails 52, 52. The usual non-weighing or dead rail track on which a car not to be weighed may pass the scale is shown at 53, 53. At, 54, is shown the main lever of the scale, connected at its short arm by the link 55, to the platform, and at its long arm by the link 56, to the double link 57, by means of which double link 57, the platform may be connected at the will of the operator either, in the one case, to the intermedate beam, 58, which by the links 59 is connected to the long arm of the second intermediate beam 60, the short arm of which latter is connected by the links 61 to the short arm of the recording beam 62; or in the other case to the intermediate beam 63 which is a lever of the second class fulcrumed on the frame of the machine and having its other end connected by the links 64 to the short arm of the hand operated scale beam 65. Thus, by moving in the one case the point of support of the fulcrum 631 of the beam 63 or, in the other case that of fulcrum 581 of the beam 58, up or down, by the means presently to be described, the operator may, at will, connect the platform either in the one case to the recording beam, or in the other case to the hand operated scale beam, and thus in the one case have the apparatus weigh the cars and record their weight automatically, or in the other case, cutting the automatic beam out, may weigh the cars by hand. This offers an opportunity for easily testing the accuracy of the scale, if that be desired, and also of making special observation of the weight of any particular car or object to be weighed by hand. It will be noted that the hand beam operates at greater multiplication of leverage from the platform than does the automatic beam.

The means for raising or lowering the point of support of one or other of the fulcrums 581 or 631 is most fully illustrated in Figs. 7, 8, 9 and 10 of the drawings. The stirrup 582 in which the fulcrum 581, of the beam 58, finds support, is connected at its upper end to a screw 583, being supported from said screw by a head 584. The screw 583 engages a nut, 585, supported on the framework of the machine, and said screw is also provided with a jam nut, 586, for locking it in any desired position. And the screw is further provided with a squared end, 587, to receive a removable wrench or crank, 588, by which it may be turned in either direction after the jam nut has been loosened. By turning this screw up or down the stirrup, 582, may be raised or lowered, thus raising or lowering the point of support of the fulcrum 581 of the beam 58. The fulcrum 631 of the beam 63 is supported in a stirrup 632 which is raised and lowered by a screw, etc., in all respects the same as the screw 583 for raising and lowering the stirrup 582. The double link 57, it will be noticed, has two slots, 571, 572, the former affording a supporting contact for the knife-edge 573 on the beam 58 and the latter a supporting contact for the knife-edge 574 on the beam 63, which supporting contacts are brought into action, one, or the other, according as these beams are raised by their respective screws. In the drawing, at Fig. 7, the beam, 58, is shown raised into action, while the beam 63 is shown lowered out of action. In order that both of the beams shall not be raised into the active position at the same instant,—which obviously would defeat the operation of the scale,—the following provision is made:—On the frame of the machine are two depending brackets 589, 590 in which slides a lock-bar 591 having two fingers 592, 593. A duplicate coiled spring 594 from the brackets to this bar tends to keep the sliding bar in a middle position. On each of the two stirrups, 582, 632, is a cam, 595, which, when the stirrup is moved down by its screw encounters a roller stud, 596, on the said sliding bar 591. On each stirrup where it may be engaged by either the finger, 592, or the finger, 593, is a notch, 597, 597. When either one of the stirrups is lowered, the cam on that stirrup, encountering one of the roller studs on the sliding bar slides said bar laterally and causes the fingers at the other end of said bar to move into the notch in the stirrup at that side, so that the lowering of the stirrup, 582, for example, operates to lock the stirrup, 632, in such manner that the latter can not be lowered, until the former has been raised and the locking bar thus released. The same is true of the lowering of the other stirrup. The result is that when the automatic recording beam is in operation the hand beam can not be put into action until the automatic beam is put out of action; and when the hand beam is in action the automatic beam cannot be put into action until the hand beam is put out of action.

At a point toward the outer end of the long arm of the recording beam 62 is the contact block, 621, receiving the knife edge, 622, in the hanger, 623. To this hanger, 623, is secured the links, 624, carrying, rigidly attached thereto, the rack-bar, 625. To the lower part of the hanger, 623, is attached the counterbalancing spring, 626, which tends to keep the knife edge at all times in contact with its block on the scale beam, and to return the rack bar after the beam shall have thrust it upward. Carried on this beam also is the weight, 627, and the plunger of a dash-pot, 628. The purpose of the rack bar, 625, is to operate the pinion, 629, of a rotary-wheel printing mechanism, said pinion being carried on the shaft 630 on which same shaft the printing wheel 631 is mounted. A special advantage of this construction is that the spring, 626, is thus placed below the automatic scale beam and the rack bar above said beam, whereby a surer action is attained. The links, 624, upon which the rack bar is mounted, are pivotally connected to the hanger, 623, by the pivots, 632, so that the arc movement of the beam is not interfered with by the vertical movement of the rack bar. That the bar shall move vertically is insured by the circumstance that it is mounted between two heads, 633, 634, connected by guide rods, 635 which slide between guide rolls, 636, on the stationary frame of the machine. This entire construction is such that the connection between the beam and the printing wheel by way of the rack bar is the single one of the knife edge contact described, the beam being thus left free to swing through its arc of movement without being hampered, and at the same time the rack bar left free to move, and is constantly maintained in a true vertical line and thus always kept in engagement with the pinion but without binding or friction, so that the weighing shall always be accurate and constant.

Operating in conjunction with the scale,—whether in weighing by the aid of the automatic recording beam or the hand beam,—is the counting mechanism so connected and combined with the recording and printing mechanism that it causes the same to register and print the passage of each car over the weighing platform, whether the recording beam, or the hand beam be in action, and the mechanism is such and so arranged that when the hand beam is to be used the counting and printing mechanism may be thrown out of action if not wanted.

The printing wheel, which carries on its periphery at regular intervals, the numeral type (not shown) for printing, in hundreds, the weight, is so constructed that when there is no weight on the platform, zero, if anything, will be printed on the tape and if said automatic beam is thrown out of action the printing wheel will still keep this position for the printing of zero. The printing impression on the paper is made by a spring actuated hammer which strikes the paper tape against the type on the printing wheel. This hammer is raised into striking position and held in this position by means of a trip device, which is released or set off by the counter mechanism actuated by a tread at the track on the platform, over which the wheels of the car being weighed ride, so that every car passing upon the platform not only actuates the automatic beam and sets the printing wheel into proper position, but at the same time actuates the counter mechanism and drops the printing hammer thus printing the weight upon the recording tape in numerals. When the automatic beam is thrown out of action and the hand beam thrown into action the printing wheel will stand at zero and the passage of the car will be recorded by the printing of the numeral zero, the counter mechanism still registering the number of cars that have passed over the scales and the printed tape still showing the weights on the cars that may have been weighed by the automatic beam but only indicating the passage of the cars not weighed by this beam by the printing of zero on the tape. It will be noted that the movement of the hammer is in a plane at right angles to the plane of movement of the printing wheel. This obviates a serious objection sometimes encountered in the operation of such printing wheels where the plane of movement of the hammer is parallel to the plane of movement of the wheel, thus causing the stroke of the hammer upon the wheel sometimes to influence the position or movement of the wheel so as to falsify the weight. In the present form the stroke of the hammer being at right angles to the plane of movement can have no influence on the position of the wheel, and therefore cannot falsify the weight.

Turning now to a consideration of the mechanism, which counts the cars and actuates the printing devices, on the platform of the scale, and in such position that the wheels of the car just as they pass off the scale shall encounter it, is the tread device 64, connected by the link 641 to the walking beam 642 furnished with the retractile spring 643. The said walking beam is in turn connected, through the compensation spring, 644, and link, 645, to an arm, 646, on the shaft 647, another arm of which shaft is connected by the link, 648, to the bell crank, 649, which by link, 650, is connected to the reciprocating actuating bar, 65, of the counting mechanism. This actuating bar is spring retracted by the spring 651. A car wheel riding over the tread acts through the above named connections to slide the actuating bar against its retracting spring through a single impulse, the tread and the intervening connections being returned through the action of the springs to normal position ready for the next wheel. Thus it will be seen that when a car passes over the platform each of its four wheels will move the actuating bar of the counter one stroke. This movement of the actuating bar is taken up by the counting mechanism as follows:— On the actuating bar 65 is pivotally mounted the dog, 651, held in position by the spring, 652, and engaging the ratchet, 653 on the vertical shaft 654, so that each stroke of the actuating bar turns this shaft through the arc of one tooth. To prevent overthrow a friction brake 655 is applied, and also a spring actuated stop dog 656. On the shaft, 654, in addition to the actuating ratchet, 653, is the cam wheel 657, the function of which is to operate the lifting levers for lifting the printing hammer once for each four strokes of the actuating bar. Said shaft also carries a cam wheel 658 which operates the levers for working the trip for tripping the printing hammer once for each four strokes of the actuating bar. A handle, 659, serves to turn the shaft, 654, whenever desired to set the same in position. And a dial 660 on the outside of the casing of the counter mechanism serves to indicate to the operator the position the shaft may occupy. The counting mechanism may be put in and out of operation by means of the push rod, 66, the inner end of which engages a projection, 661, on the dog 651. When this rod is pushed in the dog 651 is removed from engagement with the actuating ratchet wheel and further movement of the actuating bar thereafter has no effect on the ratchet. To insure the push-rod being held in or out, it is furnished with two grooves, 662, 663, into one or other of which sets the fingers of a spring, 664, holding the rod sufficiently to overcome any tendency of the spring 652 or other accidental impulse to move it, but yieldingly enough so that it may be readily pushed in or pulled out by the hand of the operator when desired. The cam for lifting the printing hammer operates through the levers and links 671, 672, 673, 674, to the lifting beam, 675. This beam, 675, has a finger, 676, which takes under the printing hammer and raises it against its retracting spring to the necessary height. The printing hammer itself is shown at 68. On the short arm of the hammer is a trigger notch 682 which when the hammer is raised is automatically engaged by the hook of the trip arm, 683. Going back to the counter mechanism, the release cam, 658, actuates the levers and links, 684, 685, 686, 687, 688, and 689. The last named lever 689 is connected directly to the trip arm 683. The release cam, like the hammer lifting one is constructed to operate once at each four strokes of the actuating bar, thus counting four treads for the wheels of each car, but is timed to operate momentarily after the lifting cam so that the hammer is lifted, its lifting devices retracted, before the release mechanism sets off the trip to cause the hammer to strike.

The inking ribbon is shown at, 69, carried on two spools, 691, 692. The latter spool is provided with a ratchet wheel, 693, engaged by a pawl, 694. This pawl is pivoted on the end of the lever 695 which by link, 696, is connected to an arm 697 mounted on the shaft, 698, that carries the bell crank, 673, which latter it will be remembered, is a part of the connecting and actuating mechanism that lifts the hammer, so that at each time the hammer is lifted the ink ribbon ratchet is actuated through one impulse and the ribbon thus changed. The paper tape is shown at 70 mounted on the spool 701 fed through a tension guide 702 and between rollers 703 to a gripping device 704 consisting of a large and small roller mounted on a shaft and fed thence to a spring takeup 705. On the gripping device are two stops 706, 707. A spring-held detent lever 708 engages one or the other of these stops 706, 707 and holds the spring takeup from gathering in the tape until the detent lever is lifted from the stop and the grip released. The detent lever is lifted by the printing hammer, at or near the end of its stroke, striking against a bar, 709, mounted on the end of an arm 710, on the shaft 711, to which shaft an arm 712 is connected at its other end to a link 713, which in turn connects with the detent lever 708. Thus it will be seen that each stroke of the hammer releases and permits the spring takeup to wind up a given amount of the paper tape.

The invention having thus been fully described claim is made as follows:—

1. In a scale for weighing cars, in combination, a weighing platform, an automatic weighing beam, a weighing beam having manually adjustable balancing means coacting therewith, connections between the platform and the weighing beams, and means for placing either of said weighing beams out of operative connection with the platform, including a movable stirrup.

2. In a weighing scale of the class described, in combination, a weighing platform, an automatic weighing beam, a weighing beam having manually adjustable balancing means coacting therewith, connections between the platform and the weighing beams, and means for placing either of said weighing beams out of operative connection with the platform, including independently movable stirrups.

3. In a weighing scale of the class described, in combination, a weighing platform, an automatic weighing beam, a weighing beam having manually adjustable balancing means coacting therewith, connections between the platform and the weighing beams, means for placing either of said weighing beams out of operative connection with the platform, and locking mechanism for preventing both of said weighing beams being moved to the inoperative position simultaneously.

4. In a weighing scale of the class described, in combination, a weighing platform, an automatic weighing beam, a weighing beam having manually adjustable balancing means coacting therewith, connections between the platform and the weighing beams, means for placing either of said weighing beams out of operative connection with the platform, including movable stirrups, and locking mechanism whereby both of said stirrups are prevented from being placed in inoperative position simultaneously.

5. In a weighing scale of the class described, in combination, a weighing platform, an automatic weighing beam, a weighing beam having manually adjustable balancing means coacting therewith, connections between the platform and the weighing beams, means for placing either of said weighing beams out of operative connection with the platform, including movable stirrups, and locking mechanism whereby both of said stirrups are prevented from being placed in inoperative position simultaneously, said locking mechanism including a slidable bar adapted to engage alternately in notches provided in the movable stirrups, and cams on said movable stirrups for moving the locking bar.

6. In a weighing scale of the class described, in combination, a weighing platform, an automatic weighing beam, a weighing beam having manually adjustable balancing means coacting therewith, and connections between the platform and the weighing beams, said connections including a double link.

7. In a weighing scale of the class described, in combination, a weighing platform, an automatic weighing beam, a weighing beam having manually adjustable balancing means coacting therewith, and connections between the platform and the weighing beams, each of said beams being provided with knife edges and said connections including a double link coöperating with the knife edges.

8. In a weighing scale of the class described, in combination, a weighing platform, an automatic weighing beam, a weighing beam having manually adjustable balancing means coacting therewith, connections between the platform and the weighing beams, each of said beams being provided with knife edges, and said connections including a double link coöperating with the knife edges, and means for rendering either of said weighing beams inoperative.

9. In a weighing scale of the class described, in combination, a weighing platform, an automatic weighing beam, a weighing beam having manually adjustable balancing means coacting therewith, connections between the platform and the weighing beams, each of said beams being provided with knife edges and said connections including a double link coöperating with the knife edges, and means for rendering either of said weighing beams inoperative, said means including movable stirrups.

10. In a weighing scale of the class described, in combination, a weighing platform, an automatic weighing beam, a weighing beam having manually adjustable balancing means coacting therewith, connections between the platform and the weighing beams, each of said beams being provided with knife edges and said connections including a double link coöperating with the knife edges, means for rendering either of said weighing beams inoperative, including movable stirrups, and locking mechanism adapted to prevent both of said beams from being rendered inoperative simultaneously.

11. In a weighing scale of the class described, in combination, a weighing platform, an automatic weighing beam, a hand weighing beam, connections from the platform to said beams, means for rendering either of said beams inoperative, printing and recording mechanism adapted to automatically register the weight of the object being weighed and including a printing wheel governed in its position by the automatic weighing beam, and counting mechanism, said printing and recording and counting mechanisms being so arranged that the passage of an object over the platform may be recorded while the automatic weighing beam is cut out of operation.

12. In a weighing scale of the class described, in combination, a weighing platform, an automatic weighing beam, a hand weighing beam, connections between the platform and said beams, means for placing either of said beams in an inoperative condition, printing and recording mechanism adapted to automatically register the weight of the object being weighed and including a printing wheel governed in its position by the automatic weighing beam, counting mechanism, connections between the counting mechanism and the printing and recording mechanism and adapted to govern the operation of the latter, and means for placing the counting mechanism in an inoperative condition.

13. In a weighing scale of the class described, in combination, a weighing platform, an automatic weighing beam, recording and printing mechanism, including a printing wheel governed in its position by said beam and a hammer, counting mechanism including a rotating shaft having cams thereon governing the movements of said hammer, and connections between the platform and the shaft adapted to rotate the latter, said connections being operated by the passage of a car or other object over the platform.

14. In a weighing scale of the class described, in combination, a weighing platform, an automatic weighing beam, recording and printing mechanism including a printing wheel governed in its position by said beam and a hammer, counting mechanism adapted to be operated by a car or other object in its passage over the platform, and including cams controlling the movements of said hammer, and means for rendering the counting mechanism inoperative.

15. In a weighing scale of the class described, in combination, a weighing platform, an automatic weighing beam, a hand weighing beam, connections between the platform and the weighing beams, means for placing either of said weighing beams out of operative connection with the platform, recording and printing mechanism including a printing wheel governed in its position by said automatic weighing beam and a hammer, counting mechanism including a rotating shaft having cams thereon adapted to control the movements of the hammer and connections from the platform to the shaft for rotating the latter, said connections being operated by the passage of a car or other object being weighed over the platform.

16. In a weighing scale of the class described, in combination, an automatic weighing beam, a hand weighing beam, connections from the platform to said beam, means for placing either of said beams out of operative connection with the platform and including movable stirrups, recording and printing mechanism adapted to be automatically operated, counting mechanism, connections from the platform to said counting mechanism and adapted to operate the latter, and connections from the counting mechanism to the printing and recording mechanism.

17. In a weighing scale of the class described, in combination, an automatic weighing beam, a hand weighing beam, connections from the platform to said beams, means for placing either of said beams out of operative connection with the platform and including movable stirrups, recording and printing mechanism adapted to be automatically operated, counting mechanism, connections from the platform to said counting mechanism and adapted to operate the latter, connections from the counting mechanism to the printing and recording mechanism, and means for rendering the counting mechanism inoperative when the automatic weighing beam is rendered inoperative.

GEORGE GOETZ.

Witnesses:
PEARL ABRAMS,
ESTHER ABRAMS.

Copies of this patent may be obtained for five cents each, by addressing the " Commissioner of Patents. Washington, D. C."